US012740908B2

(12) United States Patent
Risner

(10) Patent No.: US 12,740,908 B2
(45) Date of Patent: Sep. 22, 2026

(54) RANDOMIZED MESSAGE URN

(71) Applicant: Elizabeth Risner, Brentwood, TN (US)

(72) Inventor: Elizabeth Risner, Brentwood, TN (US)

( * ) Notice: Subject to any disclaimer, the term of this patent is extended or adjusted under 35 U.S.C. 154(b) by 0 days.

(21) Appl. No.: 19/015,161

(22) Filed: Jan. 9, 2025

(65) Prior Publication Data

US 2026/0191726 A1 Jul. 9, 2026

(51) Int. Cl.
*A61G 17/08* (2006.01)
*A61G 17/007* (2006.01)

(52) U.S. Cl.
CPC ........... *A61G 17/08* (2013.01); *A61G 17/007* (2013.01)

(58) Field of Classification Search
CPC .... A61G 17/08; A61G 17/007; E04H 13/008; A63F 9/04
USPC .................................... 446/199; 40/412, 477
See application file for complete search history.

(56) References Cited

U.S. PATENT DOCUMENTS

| | | | | | |
|---|---|---|---|---|---|
| 2,235,617 | A * | 3/1941 | Klinzing | A61G 17/08 | 27/1 |
| 3,119,621 | A * | 1/1964 | Bookman | A63F 9/0406 | 273/145 C |
| 3,168,315 | A * | 2/1965 | Bookman | A63H 33/00 | D11/131 |
| 3,654,675 | A * | 4/1972 | Peterson | E04H 13/006 | 229/5.5 |
| 4,239,223 | A * | 12/1980 | Wilson | A63F 5/00 | 273/123 R |
| 4,324,026 | A | 4/1982 | Craft | | |
| 4,632,397 | A * | 12/1986 | Rivkin | A63F 9/0406 | 273/145 CA |
| 5,029,373 | A * | 7/1991 | Raymond | A61G 17/08 | 27/1 |
| 5,379,499 | A | 1/1995 | Jackson | | |
| 5,794,318 | A * | 8/1998 | Parker | E04H 13/003 | 40/406 |
| 6,295,705 | B1 * | 10/2001 | Gersten | A61G 17/08 | 220/4.27 |
| 7,178,209 | B1 * | 2/2007 | Radziewicz | A61G 17/08 | 27/1 |
| 10,610,437 | B2 * | 4/2020 | Reynolds | A61G 17/08 | |
| 11,491,068 | B2 * | 11/2022 | Carlson | A61G 17/08 | |
| D1,000,748 | S | 10/2023 | Sengupta | | |
| 12,048,886 | B2 * | 7/2024 | Chan | A63F 9/0406 | |
| 12,329,694 | B1 * | 6/2025 | Bethany | A61G 17/08 | |
| 12,427,078 | B2 * | 9/2025 | Xiang | A61G 17/08 | |
| 2003/0024089 | A1 * | 2/2003 | Dziekonski | A61G 17/0076 | 27/1 |
| 2006/0171512 | A1 * | 8/2006 | Staudenmeier | A63F 3/001 | 379/82 |
| 2007/0084027 | A1 * | 4/2007 | Walczak | A61G 17/08 | 27/1 |

(Continued)

*Primary Examiner* — William L Miller

(57) ABSTRACT

A randomized message urn includes a first compartment, a second compartment, a die, and a view window. The first compartment is designed to contain ashes of a cremated being. The second compartment contains a liquid and includes an orifice. The die is freely floating in the liquid and includes a plurality of faces, each having text, an image, or a combination of text and an image thereon. The view window is positioned at the orifice of the second compartment to close the second compartment and permit viewing of one of the faces of the die randomly abutting against the view window.

16 Claims, 5 Drawing Sheets

(56) References Cited

U.S. PATENT DOCUMENTS

| | | | | |
|---|---|---|---|---|
| 2008/0032591 | A1 * | 2/2008 | Cullen | A63H 3/00 446/297 |
| 2019/0231628 | A1 * | 8/2019 | Reynolds | A61G 17/08 |
| 2023/0149242 | A1 | 5/2023 | Davis | |
| 2024/0143258 | A1 * | 5/2024 | Gills | H01M 10/44 |

* cited by examiner

RANDOMIZED MESSAGE URN

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to urns and memorial structures and more particularly pertains to a new randomized message urn for providing random text and images to the surviving loved ones of the deceased and cremated being, which could be a human or an animal, such as a pet. Urns are a traditional method of honoring a deceased being. However, urns are nothing more than a decorative container. The randomized message urn provides a way for surviving persons to have a more meaningful connection with the beceased person or pet beyond that provided by traditional urns.

(2) Description of Related Art Including Information Disclosed Under 37 CFR 1.97 and 1.98.

The prior art relates to urns and memorial structures. The prior art, as best understood, does not disclose an urn with a floating die therein that contains text, images, or a combination thereof on the faces of the die, which are viewable through a view window in the urn.

(h) BRIEF SUMMARY OF THE INVENTION

An embodiment of the disclosure meets the needs presented above in a randomized message urn generally comprising a first compartment, a second compartment, a die, and a view window. The first compartment is designed to contain ashes of a cremated being. The second compartment contains a liquid and includes an orifice. The die is freely floating in the liquid and includes a plurality of faces, each having text, an image, or a combination of text and an image thereon. The view window is positioned at the orifice of the second compartment to close the second compartment and permit viewing of one of the faces of the die randomly abutting against the view window.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
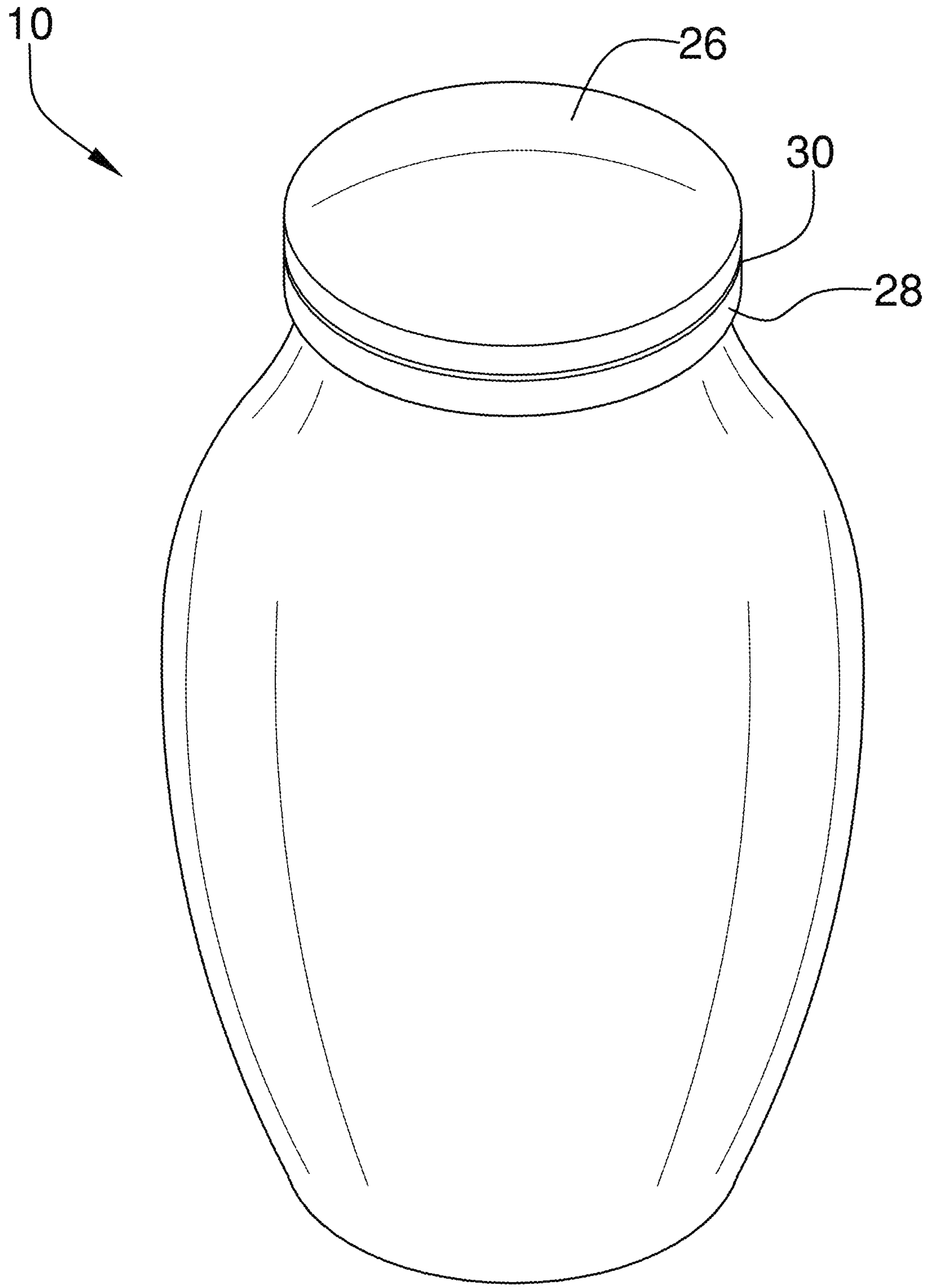
FIG. 1 is a top perspective view of a randomized message urn according to an embodiment of the disclosure.

With reference now to the drawings, and in particular to FIGS. 1 through 5 thereof, a new randomized message urn embodying the principles and concepts of an embodiment of the disclosure and generally designated by the reference numeral 10 will be described.

As best illustrated in FIGS. 1 through 5, the randomized message urn 10 generally comprises a first compartment 12, a second compartment 14, a die 16, and a view window 18. The first compartment 12 is designed to contain ashes of a cremated being. The second compartment 14 contains a liquid 20 and includes an orifice 22. The die 16 is freely floating in the liquid 20 and includes a plurality of faces 24, each having text, an image, or a combination of text and an image thereon. The view window 18 is positioned at the orifice 22 of the second compartment 14 to close the second compartment 14 and permit viewing of one of the faces 24 of the die 16 randomly abutting against the view window 18.

Figure 2:
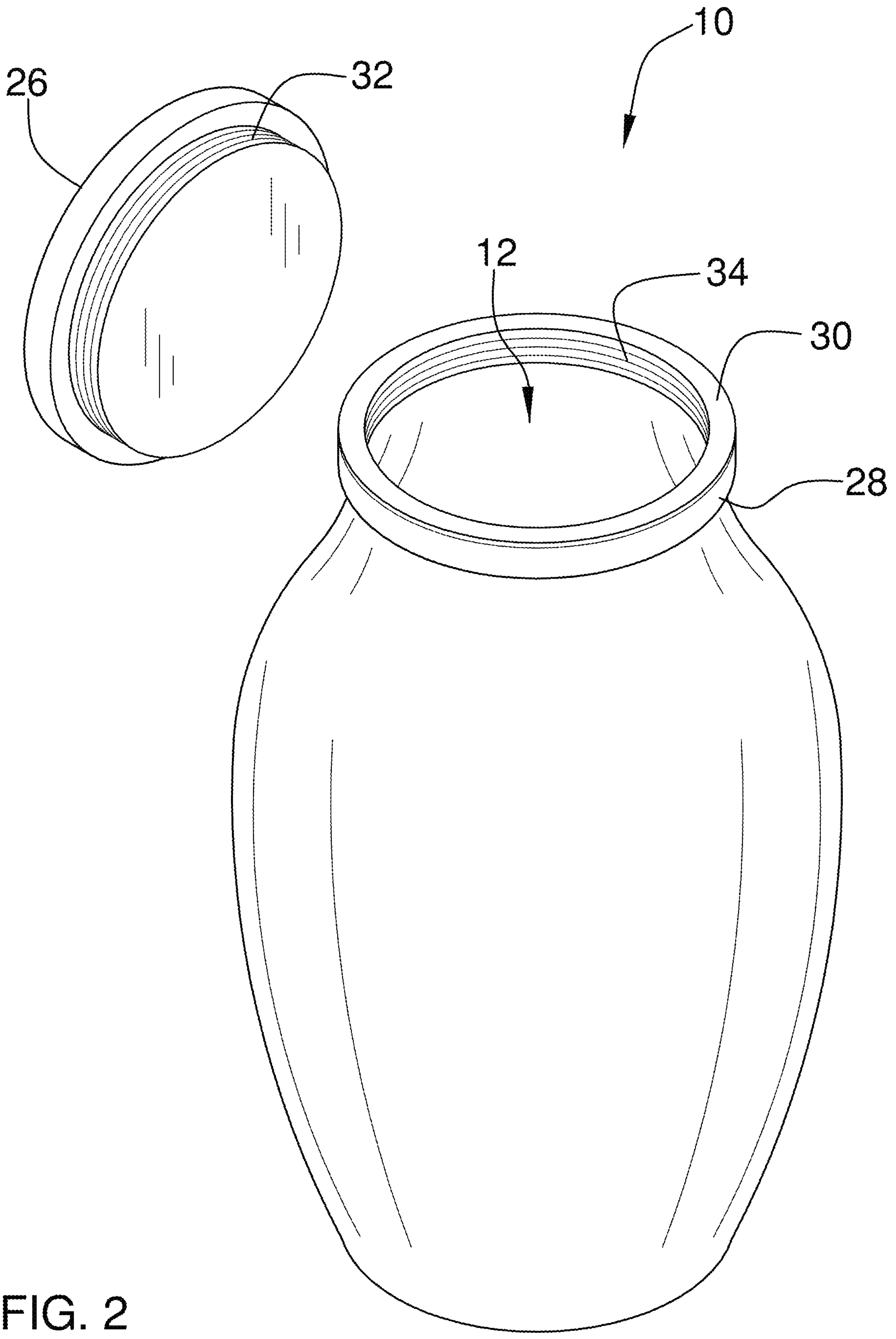
FIG. 2 is another top perspective view of an embodiment of the disclosure.
Figure 3:
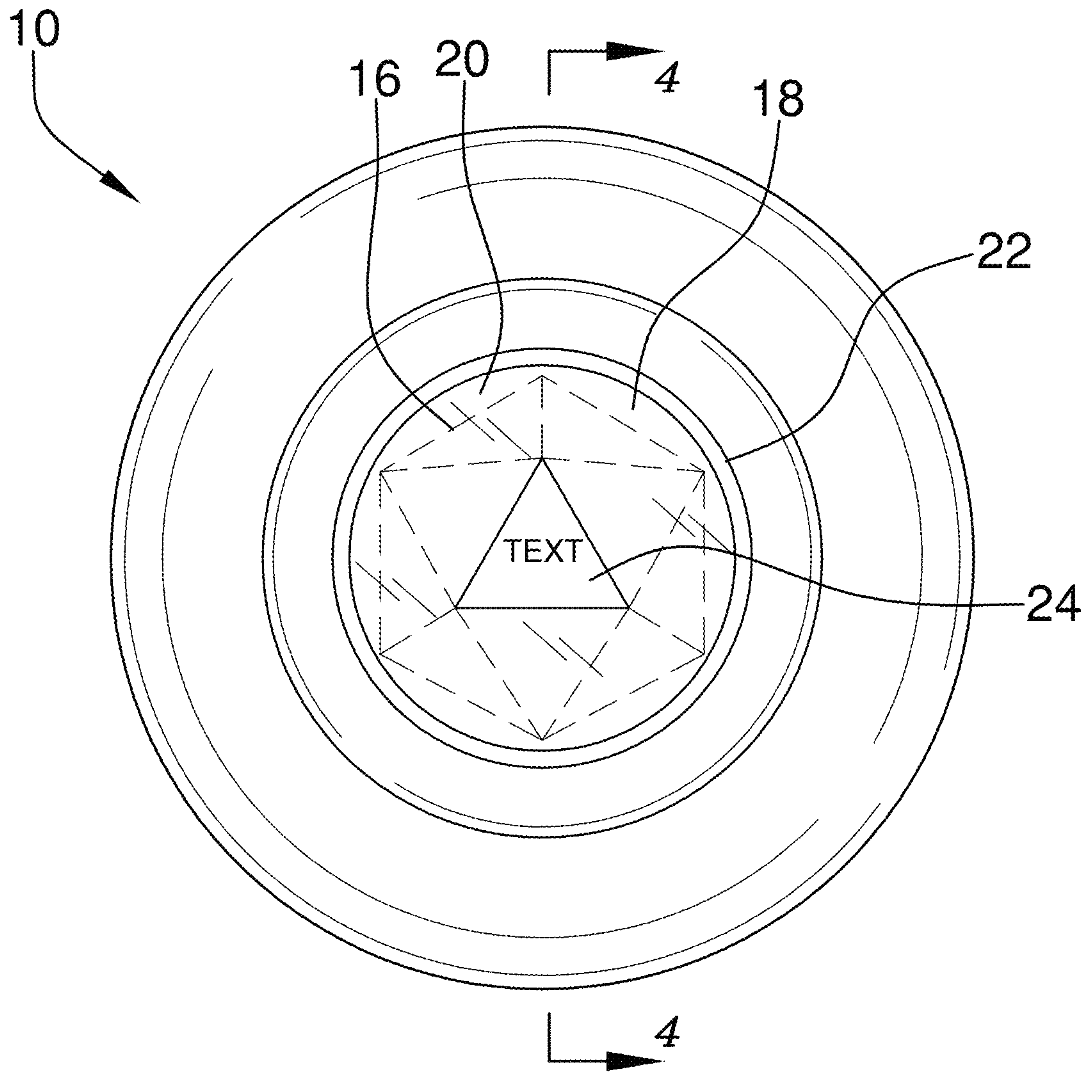
FIG. 3 is a bottom view of an embodiment of the disclosure.

As shown in FIG. 2, the urn 10 further includes a lid 26. The first compartment 12 includes a mouth portion 28 and the lid 26 is disposed at the mouth portion 28 to removably close the first compartment 12. The connection between the lid 26 and the mouth portion 28 can be accomplished by male screw threading 32 on the lid 26 and female screw threading 34 in the mouth portion 28, though a press-fit or interlocking tabs could be used. A sealing structure 30 is disposed between the lid 26 and the mouth portion 28 to seal the first compartment 12. In the exemplary embodiment shown, the sealing structure 30 is in the form of a ring attached to the mouth portion 28, though the sealing structure 30 could alternatively be attached to the lid 26. In another possible embodiment, the lid 26 is permanently attached to the mouth portion 28. In yet another possible embodiment, the lid 26 and the mouth portion 28 are omitted and the first compartment 12 is completely sealed, such as by a weld or other forming method. Regardless of the exact design, it is important that the first compartment 12 be tightly and securely closed as the urn 10 will be regularly handled and turned upside down as discussed further herein.

Figure 4:
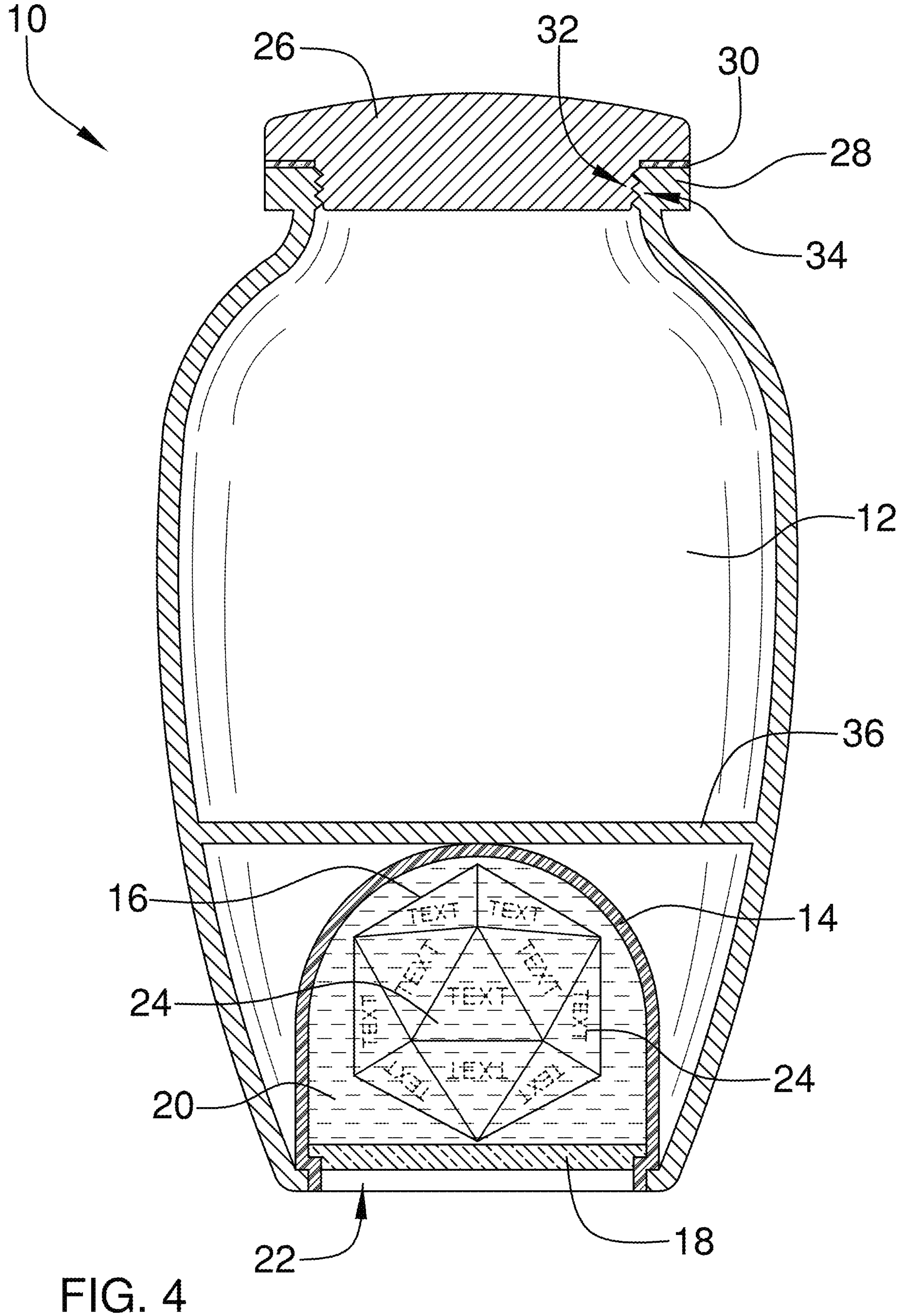
FIG. 4 is a cross-sectional view of an embodiment of the disclosure.
Figure 5:
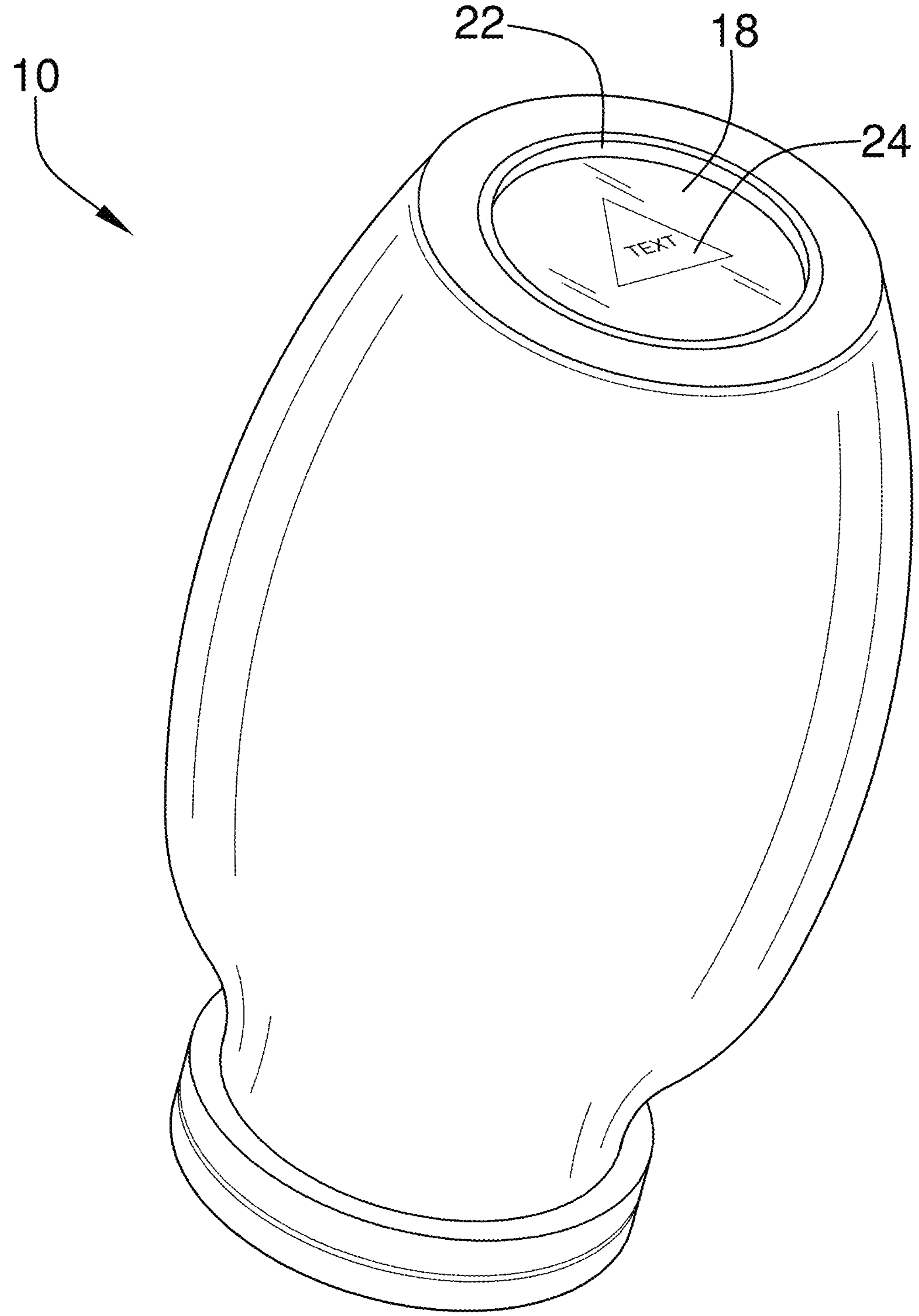
FIG. 5 is a bottom perspective view of an embodiment of the disclosure in use.

In the exemplary embodiment best seen in FIG. 4, the second compartment 14 is disposed below the first compartment 12 when the urn 10 is in an upright position. The view window 18 is disposed at a bottom section of the urn 10 and is not visible when the urn 10 is disposed on a surface in an upright position. Therefore, to view the die 16 inside the urn 10, the user must turn the urn 10 upside down, as shown in FIG. 5. In the exemplary embodiment shown, a wall 36 separates the first compartment 12 in two sections for stability and to keep the ashes separated from the second compartment 14 in the event liquid 20 were to leak out of the second compartment 14. However, this is only an exemplary design and other designs and positioning of the first compartment 12 and the second compartment 14 are within the scope of the disclosure.

As discussed above, the die 16 has multiple faces 24. Any number of faces 24 could be utilized, though a 20-sided die 16 is one possibility to maximize the number of faces 24 without the die 16 being too large or the faces 24 being too small. The text or images could be printed or embossed on the faces 24. The text on the faces 24 can communicate any message, though some could be personalized messages relating to the cremated being, such as maybe quotes from a person, biographical details, and life events. Another possibility would be general messages designed to elicit an emotional response or recollection of a memory by a user, such as "I love you" or "Remember the good times." For pets, for example, the text could be animal sounds, like "bark" or "meow." For pets or humans, the messages could be terms describing what the being is doing in the afterlife, such as "at peace" or "watching over you" for humans or "running" or "playing" for animals. As an alternative or in combination with the text, images could be included, such as personalized images of or relating to the cremated being. The images could be photos or depictions of the cremated being, or images showing symbols representing activities or emotions, such as a heart symbol for love or a fishing pole if the deceased person enjoyed that activity. The images could also be general images, such as emotion symbols, religious symbols, or, in the case of pets, animal-related symbols. Regardless of the exact message, the purpose is to communicate to the surviving user a message that elicits an emotional response, such as happiness, joy, sadness, love, and hope, and/or causes the surviving user to recall memories of times with the deceased being. In another possible embodiment, the text could be general answers to questions to allow the user to feel like he or she is conversing with the deceased being.

FIG. 5 shows the use of the randomized message urn 10. When the user turns over the urn 10, the view window 18 is visible. The die 16 floats to the top of the liquid 20, thereby causing one of the faces 24 to abut against the view window 18. The user can now see the text and/or image on the abutting face 24. Every time the user turns the urn 10 over in this manner, any one of the faces 24 of the die 16 may be randomly shown since the die 16 is freely floating in the liquid 20. The user can even jostle or shake the urn 10 to cause another face 24 of the die 16 to abut the view window 18 to thereby view another message or image. In this manner the user can experience a meaningful connection with the deceased being that can be different from one use to the next.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A randomized message urn comprising:
- a first compartment being configured to contain ashes of a cremated being;
- a second compartment containing a liquid and comprising an orifice at a bottom section thereof;
- a die freely floating in said liquid and comprising a plurality of faces, each having text, an image, or a combination of text and an image thereon; and
- a view window being disposed at said orifice of said second compartment to close said second compartment and permit viewing of one of said faces of said die randomly abutting against said view window.

2. The randomized message urn of claim 1, wherein said second compartment is disposed below said first compartment when the urn is in an upright position.

3. The randomized message urn of claim 1, wherein said text comprises personalized messages relating to the cremated being.

4. The randomized message urn of claim 1, wherein said text comprises general messages designed to elicit an emotional response or recollection of a memory by a user.

5. The randomized message urn of claim 1, wherein said image comprises personalized images of or relating to the cremated being.

6. The randomized message urn of claim 1, wherein said image comprises general images designed to elicit an emotional response or recollection of a memory by a user.

7. The randomized message urn of claim 1, wherein said view window disposed at said bottom section of the second compartment is not visible when the urn is disposed on a surface in an upright position.

8. The randomized message urn of claim 1, wherein the urn further comprises a lid, said first compartment comprises a mouth portion, and said lid is disposed at said mouth portion to removably close said first compartment.

9. The randomized message urn of claim 8, wherein the urn further comprises a sealing structure disposed between said lid and said mouth portion to seal said first compartment.

10. A randomized message urn comprising:

a first compartment being configured to contain ashes of a cremated being;

a second compartment containing a liquid and comprising an orifice at a bottom section thereof, wherein said second compartment is disposed below said first compartment when the urn is in an upright position;

a die freely floating in said liquid and comprising a plurality of faces, each having text, an image, or a combination of text and an image thereon;

a view window being disposed at said orifice of said second compartment to close said second compartment and permit viewing of one of said faces of said die randomly abutting against said view window, wherein said view window disposed at said bottom section of the second compartment is not visible when the urn is disposed on a surface in said upright position.

11. The randomized message urn of claim 10, wherein the urn further comprises a lid, said first compartment comprises a mouth portion, and said lid is disposed at said mouth portion to removably close said first compartment.

12. The randomized message urn of claim 11, wherein the urn further comprises a sealing structure disposed between said lid and said mouth portion to seal said first compartment.

13. The randomized message urn of claim 12, wherein said text comprises personalized messages relating to the cremated being.

14. The randomized message urn of claim 12, wherein said text comprises general messages designed to elicit an emotional response or recollection of a memory by a user.

15. The randomized message urn of claim 12, wherein said image comprises personalized images of or relating to the cremated being.

16. The randomized message urn of claim 12, wherein said image comprises general images designed to elicit an emotional response or recollection of a memory by a user.

* * * * *